April 9, 1968     A. BAUMGARTNER     3,376,957
VIBRATION DAMPING APPARATUS

Filed Jan. 18, 1967     3 Sheets-Sheet 1

INVENTOR.
ALOIS BAUMGARTNER
BY Edwin D. Grant
ATTORNEY

April 9, 1968  A. BAUMGARTNER  3,376,957
VIBRATION DAMPING APPARATUS
Filed Jan. 18, 1967  3 Sheets-Sheet 2

INVENTOR.
ALOIS BAUMGARTNER
BY Edwin D. Grant
ATTORNEY

April 9, 1968 A. BAUMGARTNER 3,376,957
VIBRATION DAMPING APPARATUS
Filed Jan. 18, 1967 3 Sheets-Sheet 3

INVENTOR.
ALOIS BAUMGARTNER
BY Edwin D. Grant
ATTORNEY

United States Patent Office 3,376,957
Patented Apr. 9, 1968

3,376,957
VIBRATION DAMPING APPARATUS
Alois Baumgartner, Chatsworth, Calif., assignor to Thiokol Chemical Corporation, Bristol, Pa., a corporation of Delaware
Filed Jan. 18, 1967, Ser. No. 610,124
9 Claims. (Cl. 188—96)

ABSTRACT OF THE DISCLOSURE

Vibration damping apparatus comprising a shaft mounted for movement axially of a casing and a piston mounted on said shaft within said casing, said piston having an expandable periphery so that a gap of variable width can be formed between the periphery of said piston and the wall of said casing, whereby movement of hydraulic fluid between the spaces within said casing on opposite sides of said piston is controlled by the width of said gap and the rate and amplitude of vibration of said shaft relative to said casing is thereby varied.

---

This invention relates to vibration damping devices and more particularly to vibration damping devices the resonant vibration frequency of which can be varied.

In testing the effect of vibration upon new products it is often desirable to mount a test specimen so that its vibration in certain directions occurs at a predetermined rate and amplitude. By means of embodiments of the present invention which are disclosed herein, the rate and amplitude of vibration of test specimens can be precisely controlled. Furthermore, since the disclosed embodiments of the invention are effective vibration damping devices, the invention has broad application in shock absorbing equipment.

Briefly described, vibration damping devices constructed in accordance with principles of this invention comprise fluid-filled cylindrical casings in which drive or support shafts are slidably mounted, and expandable pistons mounted on these shafts within said casing. Preferred embodiments of the invention are also provided with means for varying the natural or resonant vibration frequency of the drive shafts thereof, said means being either in the form of one or more springs operably connected to the casings of said embodiments and to the drive shafts thereof, or in the form of bushings mounted on opposite ends of the drive shafts of said embodiments and arranged so that the ends thereof move into the casings of said embodiments as said drive shafts oscillate.

It is accordingly a broad object of this invention to provide effective vibration damping devices.

Another object of this invention is to provide vibration damping devices the resonant vibration frequency of which can be controlled.

These objects, and the manner of accomplishing the same, will be more clearly understood by consideration of the following descriptioin of several embodiment of the invention, in which reference is made to the accompanying drawings wherein.

Throughout the specification and drawings, the same reference numbers refer to the same parts.

Figure 1:
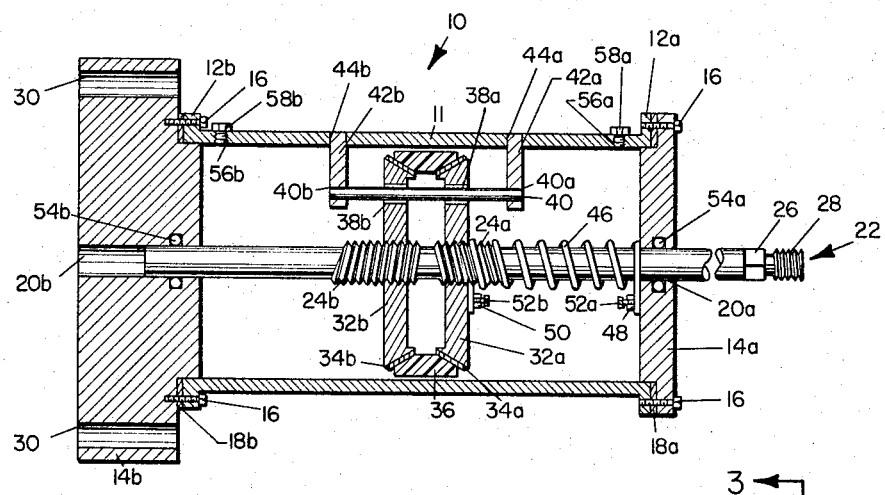
FIGURE 1 is a sectional view illustrating a first embodiment of the invention, taken along a plane that passes through the longitudinal axis thereof.

As illustrated in FIGURES 1, one embodiment of this invention comprises a casing, generally designated by reference number 10, which is formed of a hollow cylinder 11 having a circumferentially extending flange 12a, 12b integrally joined to each end thereof, and a head closure 14a and a base closure 14b respectively fixedly connected to said flanges 12a, 12b by means of a plurality of machine screws 16. A gasket 18a, 18b is disposed between each closure 14a, 14b and the adjacent flange 12a, 12b. Each closure 14a, 14b includes an aperture 20a, 20b which is coaxial with cylinder 11 and in which a shaft, generally designated by reference number 22, is slidably engaged. Shaft 22 projects from head closure 14a and includes left hand and right hand threaded portions 24a, 24b which are adjacently disposed on the shaft within casing 10. An outer portion 26 of shaft 22 is square in cross-section, and the adjacent end portion 28 of said shaft is threaded to facilitate attachment of other objects thereto. Base closure 14b is also provided with a plurality of circumferentialy spaced apertures 30 to facilitate its attachment to other objects.

Respectively engaged with the threaded portions 24a, 24b of shaft 22 are two disks 32a, 32b. As illustrated in the drawing, the peripheries of these disks are convergent in the direction of the juxtaposed ends of said threaded portions 24a, 24b, and the periphery of each disk is coated with a layer 34a, 34b of low-friction material such as polytetrafluorethylene. The inner surface of an elastic, expandable ring 36 conformably abuts the peripheries of disks 32a, 32b, and the periphery of said ring is spaced from the inner surface of cylinder 11 so as to form an annular gap therebetween. Each disk 32a, 32b has an alignment perforation 38a, 38b extending therethrough, and a rod 40 is positioned within these perforations and within a hole 40a, 40b formed in each of two support lugs 42a, 42b which are respectively fixedly disposed within apertures 44a, 44b in cylinder 11 and which project radially inwardly from the inner surface of said cylinder. Rod 40 is fixedly held within holes 40a, 40b, as by means of a forced fit therein, whereas alignment perforations 38a, 38b are sufficiently large to permit disk 32a, 32b to slide along said rod.

Positioned around shaft 22 between base closure 14a and disk 32a is a spring 46, one end of said spring extendindg through a radially extending (i.e., with respect to cylinder 11) hole in a boss 48 formed on said base closure and the oher end of said spring extending through a radially extending hole in a boss 50 formed on said disk. Machine screws 52a, 52b are respectively engaged in longitudinally extending holes in bosses 48, 50 and releasably lock the ends of spring 46 in the radially extending holes in said bosses.

Seal rings 54a, 54b are disposed around shaft 22 and within circumferentially extending grooves formed in the walls of apertures 20a, 20b in closures 14a, 14b respectively. Cylinder 11 is provided with two ports 56a, 56b in each of which a plug 58a, 58b is threadedly engaged. After the components of the described vibration damping device have been assembled within casing 10, the interior of said casing is filled with lightweight oil or hydraulic fluid through one of the ports 56a, 56b while air within said casing is vented through the oher port.

In the above-described embodiment of the invention all components are made of suitable metals except gaskets 18a, 18b and seal rings 54a, 54b, which are formed of polymeric materials, and ring 36, which is formed of an oil-resistant, semi-hard rubber.

Although not limited to a single use, the described vibration damping device can be used in vibration testing by bolting base closure 14b to the exciter head of a vibrator and connecting a test specimen to the threaded end 28 of shaft 22. Vibration of the exciter head on which base closure 14b is mounted will result in displacement of shaft 22, and the test specimen connected thereto, relative to casing 10. However, disks 32a, 32b and ring 36, which form a piston mounted on shaft 22, oppose motion of shaft 22 relative to casing 10 since fluid within said casing must be displaced from one side of said piston to the other before such motion can occur. Rotation of shaft 22 moves disks 32a, 32b in opposite directions axially of casing 10, which movement, because of the pressure applied against ring 36 by the convergent peripheries of said disks, permits the expansion of said ring to be selectively controlled. Thus the distance between the periphery of ring 36 and the inner surface of cylinder 11 can be increased or decreased as desired to vary the opposition to motion of shaft 22 relative to casing 10.

The spring rate of spring 46 can also be selected to provide a desired resonant vibration frequency of shaft 22 relative to casing 10. It will be obvious that a different spring can be installed in the vibration damping device by removing head closure 14a and loosening machine screws 52a, 52b so that the ends of the spring 46 in the device can be removed from the holes in bosses 48, 50 respectively.

If the above-described vibration damping device is used as a shock absorber, spring 46 can be removed if desired, since motion of shaft 22 relative to casing 10 is damped by the piston formed of disks 32a, 32b and ring 36. A "hard" or "soft" action of shaft 22 can be achieved by adjusting the distance between the periphery of ring 36 and the inner surface of cylinder 11.

Figure 2:
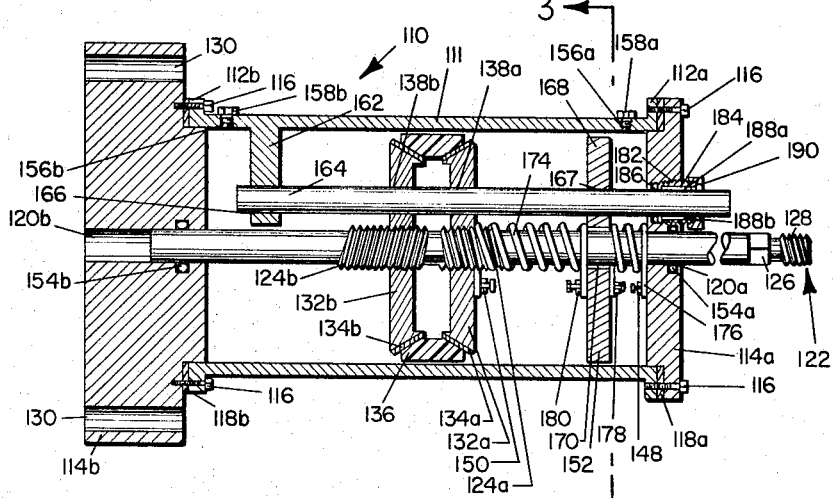
FIGURE 2 is a sectional view illustrating a second embodiment of the invention, taken along a plane that passes through the longitudinal axis thereof.
Figure 3:
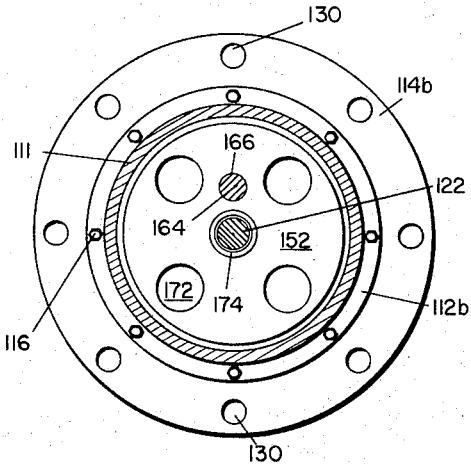
FIGURE 3 is a sectional view of said second embodiment, taken along the plane represented by line 3—3 of FIGURE 2.

FIGURES 2 and 3 illustrate a second embodiment of the invention, most of the components of which are identical to those of the embodiment illustrated in FIGURE 1. Those components of the second embodiment that correspond to components of the above-described first embodiment are designated by reference number differing by 100 from reference numbers employed in the description of the first embodiment. Thus, for example, head closure 114a (See FIGURE 2) of the second embodiment is identical to head closure 14a (See FIGURE 1) of the first embodiment except that head closure 114a includes an additional aperture 182 the longitudinal axis of which is parallel to the longitudinal axis of cylinder 111. The second embodiment of the invention also differs from the first embodiment in that it has only one support lug 162 which is integrally formed with cylinder 111 and which projects radially inwardly from the inner surface thereof. One end of a rod 164 is slidably engaged within an aperture 166 formed in support lug 162, and the rod extends through the alignment perforations 138a, 138b in disks 132a, 132b, respectively, and through aperture 182 in head closure 114a, and its other end projects from said head closure. The diameter of the alignment perforations 138a, 138b in disks 132a, 132b is such that the disks can slide along rod 164.

Rod 164 is also fixedly positioned, as by means of a forced fit, within an aperture 167 formed in a spring lockout member 168. Spring lockout member 168 is disposed transverse to rod 164 and cylinder 111 and includes an aperture 170 in which shaft 122 is positioned in spaced relation (i.e., the wall of aperture 170 is spaced from shaft 122). As illustrated in FIGURE 3, spring lockout member 168 also includes a plurality of fluid passages 172. Two springs 174, 176 are positioned around shaft 122 and respectively disposed between spring lockout member 168 and the adjacent disk 132a, and between said spring lockout member and head closure 114a. The ends of spring 176 are respectively locked in a hole in a boss 148 integrally formed on head closure 114a and in a hole in a boss 178 integrally formed on one side of spring lockout member 168, and the ends of spring 174 are respectively locked in a hole in a boss 180 integrally formed on the other side of said spring lockout member and in a hole in a boss 150 integrally formed on disk 132a. Aperture 182 in head closure 114a includes a threaded portion, and engaged within this threaded portion is a lock bushing 184 which abuts a seal ring 186 positioned around rod 164. Lock bushing 184 projects from head closure 114a and has formed therein two slots 118a, 188b which extended longitudinally of rod 164. The outer end of lock bushing 184 is formed with a tapered pipe-type thread, and a lock ring 190 is engaged therewith. Thus when lock ring 190 is tightened on lock bushing 184, the inner surface of said lock bushing is compressed against rod 164, making it possible to releasably lock said rod and spring lockout member 168 in fixed position relative to cylinder 111.

The distance between the periphery of expandable ring 136 and the inner surface of cylinder 111 can be selectively varied by rotating shaft 122 to thereby move disks 132a, 132b in opposite directions axially of casing 110. Hence the resistance of shaft 122 to motion relative to casing 110 (said casing being filled with a suitable fluid) can be selectively varied, as will be understood from the foregoing description of the first embodiment of the invention illustrated in FIGURE 1. Moreover, the resonant vibration frequency of the second embodiment of the invention can be selectively varied by either locking rod 164 in fixed position relative to casing 110 or permitting it to slide freely in the aperture in lock bushing 184 in head closure 114a and in aperture 166 in support lug 162. Thus when lock ring 190 is tightened on lock bushing 184, rod 164 and spring lockout member 168 mounted thereon are held in fixed position relative to casing 110, and spring 176 has no effect on the motion of shaft 122. However, when lock ring 190 is loosened or removed from lock bushing 184, rod 164 and spring lockout member 168 can move longitudinally of casing 110, and both springs 174 and 176 affect the motion of shaft 122. It will be obvious that the resonant vibration frequency of shaft 122 relative to casing 110 will be different under the two described conditions.

Figure 4:
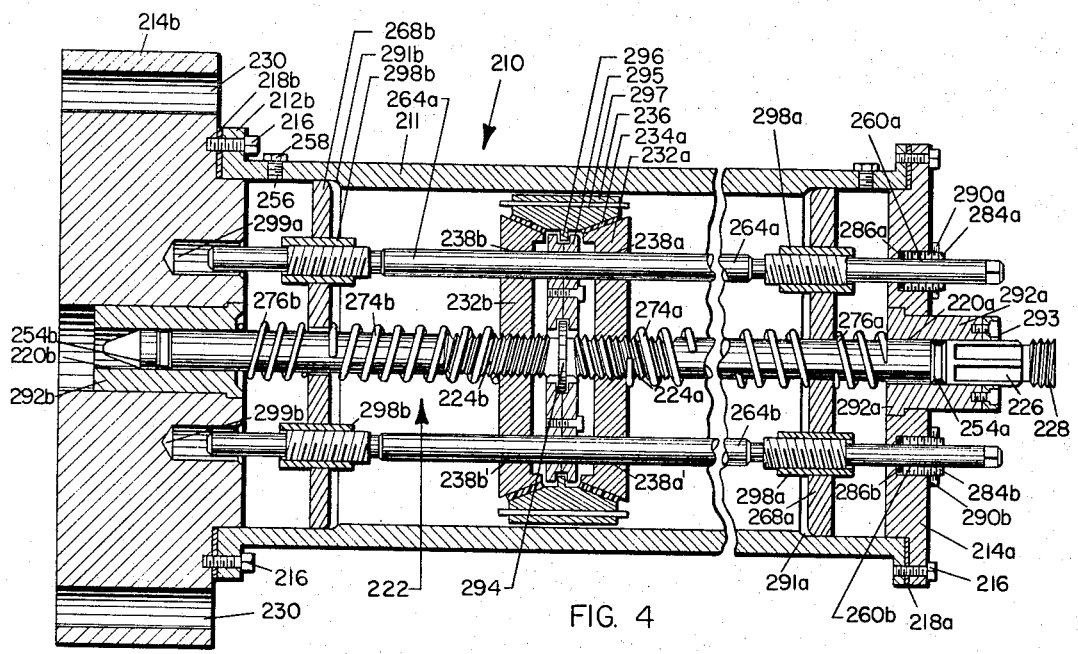
FIGURE 4 is a sectional view illustrating a third embodiment of the invention, taken along a plane that passes through the longitudinal axis thereof.

FIGURE 4 illustrates a third embodiment of the invention, many of the components of which are identical to those of the embodiments illustrated in FIGURES 1 and 2, these corresponding components being designated by reference numbers that differ by 100 and 200 from the references numbers respectively employed in the descriptions of the second and first embodiments disclosed herein. Because of the similarity between the second and third embodiments of the invention, a description of the structural modifications and additional components of the third embodiment should be adequate to provide a basis for complete understanding of its manner of operation.

Cylinder 211 of the third embodiment has a counterbore 291a, 291b extending from each end thereof, but is otherwise identical to cylinder 111 of the second embodiment. Each of the closures 214a, 214b is provided with a bushing 292a, 292b which for the purpose of interpretation of claims appended hereto should be considered as an integral part thereof. Removably secured to bushing 292a is a lock plate 293 having formed therein an aperture in which flats 226 on the end portion of shaft 222 are slidably engaged. A circumferentially extending flange 294 is integrally formed on shaft 222 between the threaded portions 224a, 224b thereof, and an annular centering member 295 is disposed around said flange. More particularly, centering member 295 comprises two sections which are rigidly joined together by machine screws, and has a circumferentially extending groove formed in both the inner and peripheral surfaces thereof. The outer portion of flange 294 is disposed within the groove formed in the inner surface of centering member 295 and expandable ring 236 is provided with an integral, circumferentially extending, inwardly projecting flange 296 that is disposed within the groove formed in the peripheral surface of said centering member. In the third embodiment of the invention, ring 236 has a plurality of circumferentially spaced rods 297 embedded therein, these rods serving to prevent warping of said ring in a direction axial to cylinder 211 when it is expanded by disks 232a 232b. Each of the disks 232a 232b includes two alignment perforations 238a, 238b, 238a', 238b' in which two rods 264a, 264b are respectively positioned these rods also extending through apertures in centering member 295. The third embodiment of the invention has two spring lockout members 268a, 268b each of which is disposed transverse to the longitudinal axis of cylinder 211 within a respective one of the counterbores 291a, 291b in said cylinder. Fixedly mounted in apertures in each spring lockout member 268a, 268b, as by means of a forced fit therein, are two internally threaded bushings 298a, 298b, the longitudinal axes of said bushings being parallel to the longitudinal axis of cylinder 211 and spaced apart 180 degrees circumferentially of the spring lockout members. For the purpose of interpretation of claims appended hereto, bushings 298a, 298b should be considered as an integral part of the spring lockout members on which they are mounted. Bushings 298a mounted on spring lockout member 268a are provided with left hand threads, whereas the bushings 298b mounted on spring lockout member 268b are provided with right hand threads. Each rod 264a, 264b includes left hand and right hand threaded portions which are respectively engaged with one of the bushings 298a mounted on spring lockout member 268a and with one of the bushings 298b mounted on spring lockout member 268b. Rods 264a, 264b extend through apertures 260a, 260b in head closure 214a respectively and project from said head closure. Each of the rods can be locked in fixed position relative to casing 210 by means of a lock bushings 284a, 284b and lock ring 290a, 290b of the type utilized in the second embodiment (see FIGURE 2) and described hereinbefore. One end of each rod 264a, 264b extends into a clearance hole 299a, 299b formed in base closure 214b.

The third embodiment of the invention is provided with two sets of springs positioned around shaft 222 on opposite sides of ring 236. More particularly, one of said sets comprises two springs 276a, 274a respectively disposed between spring lockout member 268a and head closure 214a, and between the same spring lockout member and disk 232a; and the other set comprises two springs 276b, 274b respectively disposed between spring lockout member 268b and base closure 214b, and between the same spring lockout member and disk 232b.

As in the case of the first and second embodiments of the invention, rotation of the central shaft 222 of the third embodiment moves disks 232a, 232b in opposite directions axially of cylinder 211, whereby the distance between the periphery of ring 236 and the inner surface of cylinder 211 can be selectively varied. Hence the degree of damping of vibratory motion of shaft 222 relative to casing 211 can be effectively varied. A dial (not shown) or other suitable indexing device can be mounted on casing 210 and operably connected to shaft 222 to indicate the longitudinal position of disks 232a, 232b within cylinder 211, such indexing device being calibrated to indicate the distance between the periphery of ring 236 and the inner surface of cylinder 211 or to indicate the resonant vibration frequency of shaft 222 for the different positions of said disks and for given effective dynamic mass attached to said shaft at the threaded end 228 thereof. After a desired adjustment of the expansion of ring 236 has been made, lock plate 293 can be secured to bushing 292a to prevent shaft 222 from rotating. taneously rotated to move spring lockout members 268a, 268b either toward or away from the bottom surfaces of counterbores 291a, 291b in cylinder 211 respectively. Thus the spring lockout members can be respectively locked against the bottom surfaces of counterbores 291a, 291b, in which position of said spring lockout members each spring 276a, 276b disposed between a respective one of said spring lockout members and a respective one of closures 214a, 214b will have no effect upon the vibratory motion of shift 222; or the spring lockout members can be moved away from the bottom surfaces of counterbores 291a, 291b, in which position of said spring lockout members each of the four springs 274a, 274b, 276a, 276b will affect the vibratory motion of shaft 222. Consequently, the resonant vibration frequency of shaft 222 relative to casing 210 can be set at two different frequencies by selection of the position of spring lockout members 268a, 268b in counterbores 291a 291b respectively.

Figure 5:
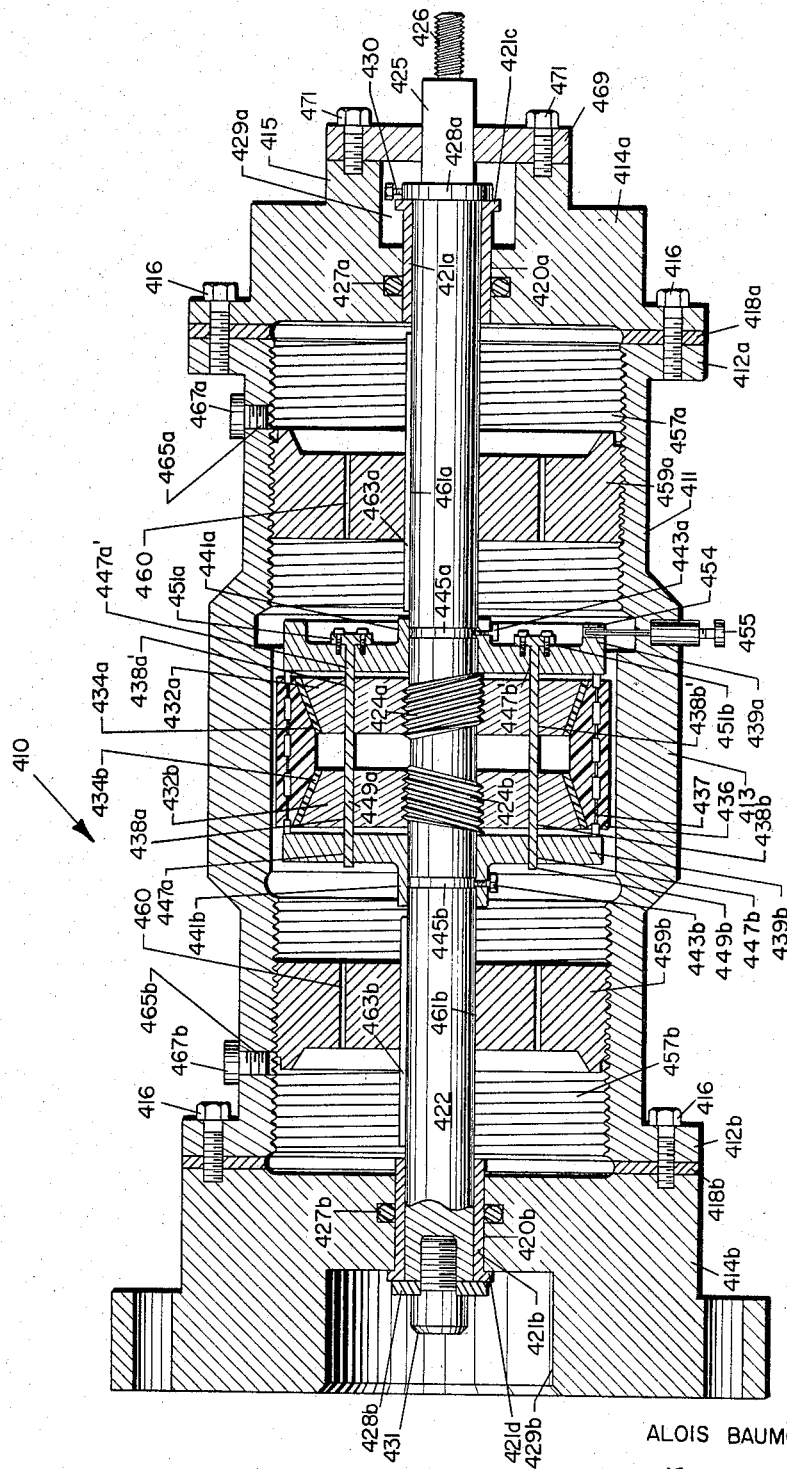
FIGURE 5 is a sectional view illustrating a fourth embodiment of the invention, taken along a plane that passes through the longitudinal axis thereof.

FIGURE 5 illustrates a fourth embodiment of the invention having casing which is generally designated by reference number 410 and which comprises a hollow cylinder 411. Cylinder 411 has a circumferentially extending flange 412a, 412b at each end thereof, and the central portion 413 of said cylinder has an increased thickness. Fixedly connected to flange 412a by means of machine screws 416 is a head closure 414a having an outwardly projecting portion 415 integrally formed thereon. Likewise, a base closure 414b is fixedly connected to flange 412b by means of machine screws 416. The joints between flanges 412a, 412b and closures 414a, 414b are sealed by gaskets 418a, 418b respectively. Each closure 414a, 414b includes an aperture 420a, 420b which is coaxial with cylinder 411 and in which is slidably disposed a compression bushing 421a, 421b having an integral, radially projecting, circumferentially extending flange 421c, 421d integrally formed on the outer end thereof. A shaft 422 is slidably engaged within compression bushings 421a, 421b, said shaft projecting from head closure 414a and including left hand and right hand threaded portions 424a, 424b which are adjacently disposed on said shaft within casing 410. An outer portion 425 of shaft 422 is square in cross-section, and the conjoined end portion 426 of said shaft is threaded to facilitate attachment of other objects thereto. A seal ring 427a, 427b is positioned in a circumferentially extending groove formed in the wall of each aperture 420a, 420b in closures 414a, 414b. A pair of drive members 428a, 428b are respectively fixedly positioned at opposite ends of shaft 422 and project radially therefrom. More specifically, drive member 428a is a collar positioned around shaft 422 within an enlarged portion 429a of aperture 420a and locked on said shaft by means of a set screw 430, and drive member 428b is a washer-shaped member secured to the opposite end of said shaft by means of a machine screw 431 and positioned within an enlarged portion 429b of aperture 420b.

Respectively engaged with the threaded portions 424a, 424b of shaft 422 are two disks 432a, 432b the peripheries of which are convergent in the direction of the juxtaposed ends of said threaded portions. The periphery of each disk is coated with a layer 434a, 434b of low friction material such as polytetrafluoroethylene. The inner surface of an elastic, expandable ring 436 conformably abuts the peripheries of disks 432a, 432b, and the periphery of said ring is spaced from the inner surface of cylinder 411. Ring 436 has a plurality of circumferentially spaced rods 437 embedded therein to prevent warping thereof said rods having formed thereon a plurality of longitudinally spaced portions of increased diameter that serve to hold the rods in proper position within said ring. Each disk 432a, 432b includes two alignment perforations 438a, 438b, 438a', 438b'.

The fourth embodiment of the invention is provided with two alignment members 439a, 439b rotatably mounted on shaft 422 adjacent disks 432a, 432b respectively. More particularly, each alignment member 439a, 439b is disk-shaped and includes an integral, longitudinally extending flange 441a, 441b in which is threadedly engaged a set screw 443a, 443b, the end of said set screw being slidably engaged within a circumferentially extending groove 445a, 445b formed in shaft 422. Each alignment member also includes two alignment perforations 447a, 447b, 447a', 447b', and two rods 449a, 449b are respectively positioned within these perforations and within the alignment perforations 438a, 438b, 438a', 438b' in disks 432a, 432b. Each rod 449a, 449b has an integral, disk-shaped head portion 451a, 451b that is detachably connected to disk 439a by means of machine screws. The alignment perforations in disks 432a, 432b are sufficiently large to permit said disks to move freely along rods 449a, 449b. The periphery of alignment member 439a contains at least one radially extending hole 454 in which the end of a plunger 455 can be releasably engaged, said plunger being mounted in portion 413 of cylinder 411.

Cylinder 411 has left hand and right hand internal threaded portions 457a, 457b respectively extending from opposite ends thereof. Two baffles 459a, 459b are respectively transversely disposed within casing 411 on opposite sides of ring 436, each of said baffles including a plurality of fluid passages 460 and an aperture 461a, 461b in which shaft 422 is slidably disposed. The peripheries of baffles 459a, 459b are respectively engaged with the threaded portions 457a, 457b of cylinder 411, and each of the baffles has a longitudinally extending slot formed in the wall of the aperture 461a, 461b therein. Shaft 422 is also provided with two longitudinally extending slots (not shown) in each of which is positioned a key 463a, 463b, these keys being also respectively positioned in the slots in baffles 459a, 459b. The slots in baffles 459a, 459b provide a sliding fit for keys 463a, 463b, and thus baffles 459a, 459b can move axially of shaft 422 when the latter is turned and keys 463a, 463b mounted therein turn said baffles in the threaded portions 457a, 457b of cylinder 411. Casing 410 can be filled with a suitable hydraulic fluid through one of two ports 465a, 465b located at opposite ends thereof, these ports having machine screws 467a, 467b respectively threadedly engaged therein. A lock plate 469, having a central aperture the walls of which slidably engage the square cross-section portion 425 of shaft 422, is secured to portion 415 of head closure 414a by means of machine screws 471 to prevent said shaft from rotating when the vibration damping device is in use.

The vibratory motion of shaft 422 relative to casing 410 can be damped to different extents by engaging the end of plunger 455 within the radially extending hole 454 in the periphery of alignment member 439a and removing lock plate 469 so that shaft 422 can be rotated, which rotation of shaft 422 changes the spacing between disks 432a, 432b and thus the spacing between the periphery of ring 436 and the inner surface of cylinder 411. After an adjustment of disks 432a, 432b has been made, the end of plunger 455 is removed from engagement with alignment member 439a and lock plate 469 is again secured to head closure 414a.

In the three previously described embodiments of the invention, the resonant vibration frequencies of the central drive or support shafts thereof are selectively varied by means of spring action. However, the resonant vibration frequency of shaft 422 relative to casing 410 is varied by means of baffles 459a, 459b. This will be understood by considering the function of said baffles and compression bushings 421a, 421b. In FIGURE 5 shaft 422 is illustrated as it appears when displaced, relative to casing 410, in the direction of head closure 414a. It will be noted that when shaft 422 moves toward head closure 414a, drive member 428b on the side of said shaft which is on the left in the drawing contacts compression bushing 421b and forces the inner end thereof into that portion of the interior of casing 410 between baffle 459b and base closure 414b, thus compressing the fluid within this portion of said casing. When shaft 422 moves toward base closure 414b the pressure within the same portion of casing 410 forces compression bushing 421b to the left of its illustrated position, while drive member 428a on the other end of said shaft moves the end of compression bushing 421a into that portion of the interior of casing 410 between baffle 459a and head closure 414a. The effect of movement of the ends of compression bushings 421a and 421b into the interior of casing 410 is equivalent to the function of the springs utilized in the embodiments of the invention illustrated in FIGURES 1 through 4, namely, the action of said compression bushings affects the resonant vibration frequency of the central drive or support shaft 422 relative to casing 410. The extent to which fluid within the end portions of the interior of casing 410 is compressed by the action of compression bushings 421a, 421b depends upon the volumes of said end portions and the resonant vibration frequency of shaft 422 relative to casing 410 decreases as said volumes increase. Thus the resonant vibration frequency of shaft 422 relative to casing 410 can be selectively varied, without changing the spacing between disks 432a, 432b, by disengaging the inner end of plunger 455 from the hole 454 in the periphery of disk 432a and rotating shaft 422, thereby moving baffles 459a, 459b toward or away from closures 414a, 414b depending upon the direction in which said shaft is rotated.

Figure 6:
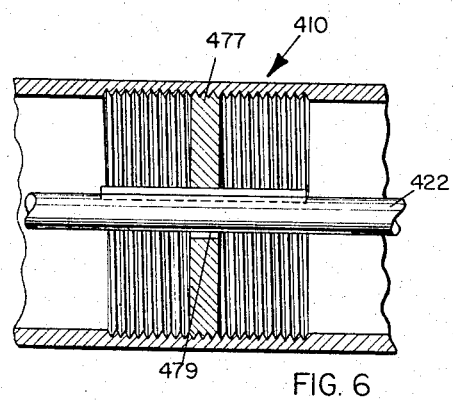
FIGURES 6, 7 and 8 illustrate modifications of certain components of said fourth embodiment.
Figure 7:
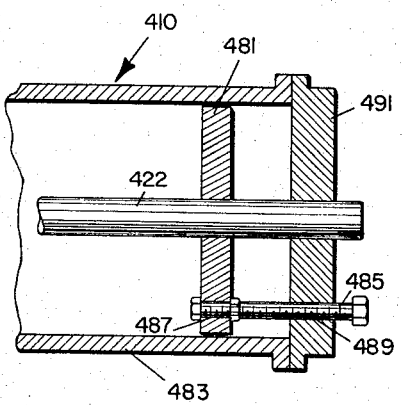

FIGURES 6 and 7 illustrate modifications of baffles 459a, 459b of the fourth embodiment of the invention. The baffle 477 illustrated in FIGURE 6 differs from baffles 459a, 459b only in having no fluid passages such as fluid passages 460 of FIGURE 5 extending therethrough, and in having an aperture 479 the wall of which is spaced from shaft 422 rather than slidably engaged therewith as are the apertures 461a, 461b in baffles 459a, 459b. The baffle 481 illustrated in FIGURE 7 is slidably mounted on shaft 422 as are baffles 459a, 459b, but baffle 481 is not threadedly engaged with the cylinder 483 of casing 410. In this modification of the fourth embodiment of the invention, baffle 481 (and its counterpart located at the opposite end of casing 410) can be moved along shaft 422 by means of a screw 485 that is rotatably engaged within an aperture 487 in said baffle and threadedly engaged within an aperture 489 in head closure 491. It should be readily apparent that the baffle arrangements illustrated in FIGURES 6 and 7 can be substituted for that illustrated in FIGURE 5.

Figure 8:
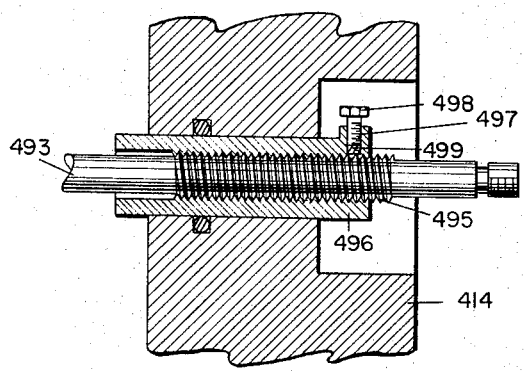

FIGURE 8 is a cross-sectional view illustrating modifications of the central drive or support shaft 422 and the compression bushings 421a, 421b of the fourth embodiment. In this modification the central shaft, designated by reference number 493 to distinguish it from shaft 422 which has a different structure, has a threaded portion 495 at each end thereof, only one end of said shaft being illustrated for the sake of simplicity in the drawing. A compression bushing 496 is engaged with each of the threaded portions 495 of shaft 493, this compression bushing having formed therein a radially extending, threaded aperture 497 in which a set screw 498 is engaged. An insert 499 of soft metal is disposed within aperture 497 between set screw 498 and the threaded portion 495.

If the compression bushing arrangement illustrated in FIGURE 8 is substituted for that illustrated in FIGURE 5, the resonant vibration frequency of shaft 493 relative to casing 410 can be varied by turning the compression bushings so that they are moved either toward or away from baffles 459a, 459b, thus varying the extent to which the fluid between said baffles and the adjacent closures 414a, 414b is compressed as shaft 422 vibrates.

Other modifications of the disclosed embodiments of the invention can obviously be made without departing from the principles of the invention. For example, each of the disks 32, 132, 232, and 432 of the embodiments illustrated in FIGURES 1, 2, 4 and 5 respectively can be formed with a helical groove in the wall of its central aperture, and a pin can be fixedly mounted on the shaft extending through said aperture so that it can be positioned in said groove. Rotation of the shaft of a vibration damping device arranged as described would move the disks longitudinally of said shaft as in the illustrated embodiments. Therefore, the scope of the invention is to be considered as limited only by the terms of the appended claims.

What is claimed is:

1. A vibration damping device comprising:
   a casing comprising a hollow cylinder and a pair of closures respectively fixedly connected to the ends of said cylinder;
   a shaft axially disposed within said cylinder, said shaft having a pair of oppositely threaded portions thereon and being slidably supported by said closures and projecting from at least one thereof;
   a piston comprising a pair of disks disposed within said cylinder and mounted on said shaft on said threaded portions thereof and adapted to move toward each other on said threaded shaft portions in response to rotation of said shaft, at least a portion of the periphery of said piston being expandable;
   said disks selectively expanding said expandable peripheral portion of said piston, whereby the distance between the periphery of said piston and the inner surface of said cylinder can be varied; and, means, operably interconnected to said casing and to said shaft for controlling the resonant vibration frequency of said shaft relative to said casing.

2. A vibration damping device as defined in claim 1 wherein said means for controlling the resonant vibration frequency of said shaft comprises at least one spring one end of which is connected to said piston and the other end of which is connected to one of said closures.

3. A vibration damping device as defined in claim 1 wherein said means for controlling the resonant vibration frequency of said shaft comprises:
   at least one spring lockout member disposed within said casing between said piston and one of said closures and provided with an aperture through which said shaft extends, said spring lockout member being movable axially of said cylinder;
   a pair of springs one of which is connected to said spring lockout member and said piston and the other of which is connected to said spring lockout member and the adjacent one of said closures; and
   means operably connected to said spring lockout member and said casing for releasably locking said spring lockout member in fixed position relative to said casing.

4. A vibration damping device as defined in claim 1 wherein said means for controlling the resonant vibration frequency of said shaft comprises:
   at least one baffle transversely disposed within said casing between said piston and one of said closures, said baffle including an aperture in which said shaft is slidably disposed and having at least one fluid passage extending therethrough, the periphery of said baffle being threadedly engaged with said cylinder and said baffle being keyed to said shaft, whereby rotation of said shaft moves said baffle axially of said cylinder;
   a bushing slidably mounted on the end of said shaft that is adjacent said baffle, the periphery of said bushing being slidably engaged with the adjacent one of said closures; and
   means mounted on said shaft for moving one end of said bushing into said cylinder when said shaft moves toward said baffle.

5. A vibration damping device as defined in claim 1 wherein said means for controlling the resonant vibration frequency of said shaft comprises:
   at least one baffle transversely disposed within said casing between said piston and one of said closures and provided with an aperture in which said shaft is disposed in spaced relation, the periphery of said baffle being threadedly engaged with said cylinder and said baffle being keyed to said shaft, whereby rotation of said shaft moves said baffle axially of said casing;
   a bushing slidably mounted on the end of said shaft that is adjacent said baffle, the periphery of said bushing being slidably engaged with the adjacent one of said closures; and
   means mounted on said shaft for moving one end of said bushing into said cylinder when said shaft moves toward said baffle.

6. A vibration damping device as defined in claim 1 wherein said means for controlling the resonant vibration frequency of said shaft comprises:
   at least one baffle transversely disposed within said cylinder between said piston and one of said closures and slidably mounted on said shaft, the periphery of said baffle being spaced from the inner surface of said cylinder;
   means interconnected to said casing and said baffle for moving said baffle to different positions axially of said shaft;
   a bushing slidably mounted on the end of said shaft that is adjacent said baffle, the periphery of said bushing being slidably engaged with the adjacent one of said closures; and
   means mounted on said shaft for moving one end of said bushing into said cylinder when said shaft moves toward said baffle.

7. A vibration damping device comprising:
   a casing comprising a hollow cylinder and a head closure and a base closure respectively fixedly connected to opposite ends of said cylinder, each of said closures including an aperture that is substantially coaxial with said cylinder and said head closure also including an additional aperture the longitudinal axis of which is substantially parallel to the longitudinal axis of said cylinder;
   a shaft slidably and rotatably engaged within said coaxial apertures in said closures, said shaft projecting from said head closure and including left hand and right hand threaded portions which are adjacently disposed within said casing;
   a pair of disks respectively engaged with said threaded portions of said shaft, the peripheries of said disks being convergent in the direction of the juxtaposed ends of said threaded portions of said shaft, each of said disks having an alignment perforation extending therethrough;
   an expandable ring the inner surface of which conformably abuts the peripheries of said disks, rotation of said shaft moving said disks in opposite directions axially of said casing, whereby the distance between the periphery of said ring and the inner surface of said cylinder can be selectively varied;
   a rod slidably positioned within said alignment preforations in said disks and within said additional aperture in said head closure, said rod preventing rotation of said disks;
   a spring lockout member transversely disposed within said casing between said piston and one of said closures and fixedly mounted on said rod, said spring lockout member including an aperture in which said shaft is positioned and at least one fluid passage which extends therethrough;
   a pair of springs respectively one of which is connected to said spring lockout member and the adjacent one of said closures and the other of which is connected to said spring lockout member and the adjacent one of said disks; and
   means mounted on said head closure for releasably locking said rod in fixed position relative to said casing.

8. A vibration damping device comprising:
a casing comprising a hollow cylinder having a counterbore extending from each end thereof and a head closure and a base closure respectively fixedly connected to opposite ends of said cylinder, each of said closures including an aperture that is substantially coaxial with said cylinder and said head closure also including a pair of apertures the longitudinal axes of which are substantially parallel to the longitudinal axis of said cylinder and spaced apart 180 degrees circumferentially thereof;
a shaft slidably and rotatably engaged within said coaxial apertures in said closures, said shaft projecting from said head closure and including left hand and right hand threaded portions which are adjacently disposed within said casing, a radially projecting, circumferentially extending flange being formed on said shaft between said threaded portions thereof;
a pair of disks respectively engaged with said threaded portions of said shaft, the peripheries of said disks being convergent in the direction of the juxtaposed ends of said threaded portions of said shaft, each of said disks including a pair of alignment perforations which are spaced apart 180 degrees circumferentially thereof;
an annular centering member disposed between said disks and having a circumferentially extending groove formed in both the inner and peripheral surfaces thereof, said flange on said shaft being disposed within said groove in said inner surface;
an expandable ring the inner surface of which conformably abuts the peripheries of said disks and which includes a radially projecting, circumferentially extending flange that is disposed within said groove in said outer surface of said centering member, rotation of said shaft moving said disks in opposite directions axially of said casing, whereby the distance between the periphery of said ring and the inner surface of said cylinder can be selectively varied;
a pair of spring lockout members respectively transversely disposed within said counterbores in said cylinder and movable axially thereof, each of said spring lockout members including an aperture in which said shaft is positioned, a pair of threaded apertures which are spaced apart 180 degrees circumferentially thereof, and a plurality of fluid passages which extend therethrough;
two sets of springs positioned around said shaft and each comprising a pair of springs respectively disposed between one of said spring lockout members and the adjacent one of said closures, and between the same spring lockout member and the adjacent one of said disks;
a pair of rods respectively slidably and rotatably positioned within said alignment perforations in said disks and within said pair of circumferentially spaced apertures in said head closure to thereby prevent rotation of said disks, said rods projecting from said head closure and each including threaded portions that are respectively engaged within said threaded apertures in said spring lockout members, rotation of said rods moving said spring lockout members axially of said casing whereby they can respectively be releasably locked against the bottom surfaces of said counterbores in said cylinder.
9. A vibration damping device comprising:
a casing comprising a hollow cylinder and a head closure and a base closure respectively fixedly connected to opposite ends of said cylinder, said cylinder having left hand and right hand internal threaded portions respectively extending from opposite ends thereof, each of said closures including an aperture that is substantially coaxial with said cylinder;
a pair of compression bushings respectively slidably disposed within said apertures in said closures and projecting outwardly therefrom, each of said compression bushings having a radially projecting, circumferentially extending flange formed on the outer end thereof;
a shaft slidably and rotatably engaged within said compression bushings, said shaft projecting from said head closure and including left hand and right hand threaded portions which are adjacently disposed within said casing;
a pair of drive members respectively fixedly positioned at opposite ends of said shaft and projecting radially therefrom;
a pair of disks respectively engaged with said threaded portions of said shaft, the peripheries of said disks being convergent in the direction of the juxtaposed ends of said threaded portions of said shaft, each of said disks having at least one alignment perforation extending therethrough;
an expansible ring the inner surface of which conformably abuts the peripheries of said disks, rotation of said shaft moving said disks in opposite directions axially of said casing, whereby the distance between the periphery of said ring and the inner surface of said cylinder can be selectively varied;
a pair of alignment members each rotatably mounted on said shaft adjacent the outer face of a respective one of said disks and each having at least one alignment perforation extending therethrough, one of said alignment members also having at least one hole formed in its periphery;
a rod positioned within said alignment perforations in said disks and said alignment members;
a plunger mounted on said cylinder so as to be releasably engageable within said hole in said one alignment member;
a pair of baffles respectively transversely disposed within said casing on opposite sides of said ring, each of said baffles including an aperture in which said shaft is slidably disposed and having at least one fluid passage extending therethrough, the peripheries of said baffles being respectively engaged with said threaded portions of said cylinder and said baffles being keyed to said shaft, whereby rotation of said shaft moves said baffles in opposite directions axially of said cylinder.

References Cited
UNITED STATES PATENTS

| | | | |
|---|---|---|---|
| 1,215,736 | 2/1917 | Stafford | 188—88 X |
| 1,763,064 | 6/1930 | Paton et al. | |
| 2,071,701 | 2/1937 | Mejean | 188—88 |
| 2,586,043 | 2/1952 | Hodgson et al. | 188—1 |
| 2,615,534 | 10/1952 | Blake | 188—88 X |
| 3,158,894 | 12/1964 | Quinn | 16—66 |
| 3,313,380 | 4/1967 | Person | 188—96 X |

MILTON BUCHLER, *Primary Examiner.*

G. E. HALVOSA, *Assistant Examiner.*

UNITED STATES PATENT OFFICE
CERTIFICATE OF CORRECTION

Patent No. 3,376,957

April 9, 1968

Alois Baumgartner

It is hereby certified that error appears in the above numbered patent requiring correction and that the said Letters Patent should read as corrected below.

Column 1, line 58, "embodiment" should read -- embodiments --. Column 4, line 12, "118a" should read -- 188a --. Column 5, lines 74 and 75, cancel "taneously rotated to move spring lockout members 268a, 268b either toward or away from the bottom surfaces of" and insert as a new paragraph -- It will be recognized that rods 264a, 264b can be simultaneously rotated to move spring lockout members 268a, 268b either toward or away from the bottom surfaces of --.

Signed and sealed this 19th day of August 1969.

(SEAL)
Attest:

EDWARD M. FLETCHER, JR.
Attesting Officer

WILLIAM E. SCHUYLER, JR.
Commissioner of Patents